(12) United States Patent
Dams

(10) Patent No.: US 7,166,329 B2
(45) Date of Patent: Jan. 23, 2007

(54) METHOD OF RENDERING SUBSTRATES OIL AND WATER REPELLENT WITH A FLUOROCHEMICAL OLIGOMERIC SILANE

(75) Inventor: Rudolf J. Dams, Antwerp (BE)

(73) Assignee: 3M Innovative Properties Company, St. Paul, MN (US)

( * ) Notice: Subject to any disclaimer, the term of this patent is extended or adjusted under 35 U.S.C. 154(b) by 521 days.

(21) Appl. No.: 10/053,396

(22) Filed: Jan. 17, 2002

(65) Prior Publication Data

US 2003/0171484 A1    Sep. 11, 2003

(30) Foreign Application Priority Data

Jan. 19, 2001    (EP) .................................. 01200207

(51) Int. Cl.
 B05D 3/10      (2006.01)
 B32B 27/28     (2006.01)
 C08L 27/12     (2006.01)

(52) U.S. Cl. ........................ 427/344; 427/340; 524/544; 528/26; 528/30; 528/32; 252/8.62; 252/389.31; 428/427; 428/446

(58) Field of Classification Search ................ 524/544, 524/588, 315, 773, 881; 528/26, 30, 32, 528/363, 364, 367, 376, 392, 401, 69; 252/389.31, 252/389.32, 388, 8.62; 570/126; 562/586, 562/849; 556/400
See application file for complete search history.

(56) References Cited

U.S. PATENT DOCUMENTS

| | | | |
|---|---|---|---|
| 2,803,615 A | | 8/1957 | Ahlbrecht et al. |
| 4,085,137 A | | 4/1978 | Mitsch et al. |
| 4,633,004 A | * | 12/1986 | Boutevin et al. ............ 556/419 |
| 4,761,459 A | * | 8/1988 | Matsuo et al. ............... 525/479 |
| 4,886,862 A | | 12/1989 | Kuwamura et al. |
| 4,927,950 A | | 5/1990 | Hisamoto et al. |
| 5,274,159 A | | 12/1993 | Pellerite et al. |
| 5,292,796 A | | 3/1994 | Dams et al. |
| 5,442,011 A | | 8/1995 | Halling |
| 5,453,540 A | | 9/1995 | Dams et al. |
| 5,482,991 A | * | 1/1996 | Kumar et al. ................ 524/506 |
| 5,527,931 A | | 6/1996 | Rich et al. |
| 5,550,184 A | | 8/1996 | Halling |
| 5,608,003 A | * | 3/1997 | Zhu ............................ 524/516 |
| 5,760,126 A | * | 6/1998 | Engle et al. ................. 524/516 |
| 5,980,992 A | | 11/1999 | Kistner et al. |
| 5,998,549 A | | 12/1999 | Milbourn et al. |
| 6,156,860 A | * | 12/2000 | Tanaka et al. ............... 526/245 |
| RE37,022 E | * | 1/2001 | Sugiyama et al. ........... 524/463 |
| 6,649,272 B1 | * | 11/2003 | Moore et al. ................ 428/447 |
| 2003/0124351 A1 | | 7/2003 | Sakamoto et al. |
| 2003/0168783 A1 | | 9/2003 | Dams |
| 2004/0092675 A1 | | 5/2004 | Moore et al. |
| 2005/0136264 A1 | * | 6/2005 | Dams et al. ................. 428/429 |

FOREIGN PATENT DOCUMENTS

| | | |
|---|---|---|
| EP | 0222157 | 5/1987 |
| EP | 0248383 | 12/1987 |
| EP | 0337474 | 10/1989 |
| EP | 0426530 | 5/1991 |
| EP | 0526976 | 2/1992 |
| EP | 933377 A2 | 8/1999 |
| EP | 937748 A2 | 8/1999 |
| EP | 978524 A1 | 2/2000 |
| JP | 62-63560 | 3/1987 |
| JP | 07-062297 * | 8/1993 |
| JP | 2000169483 | 6/2000 |
| WO | WO 96/16630 | 6/1996 |
| WO | WO 97/00230 | 1/1997 |
| WO | WO 99/29636 | 6/1999 |

OTHER PUBLICATIONS

Machine Translation of JP 07-062297 (1993).*
Jenkins A D et al: "Glossary of Basic in Polymer Science" Pure & Applied Chemistry, Pergamon Press, Oxford, GB, vol. 68, No. 12, 1996, pp. 2287-2311, XP000933983.
U.S. Appl. No. 10/053,001, filed Jan. 17, 2002, Water Soluble or Water Dispersible Fluorochemical Silanes for Rendering Substrates Oil and Water Repellent.
Standard Test No. 22, published in the 1985 Technical Manual and Yearbook of the American Assoication of Textile Chemists and Colorists (AATCC).

* cited by examiner

Primary Examiner—Vasu Jagannathan
Assistant Examiner—Vickey Ronesi

(57) ABSTRACT

A fluorochemical composition comprising of organic solvent and fluorochemical oligomer represented by the general formula:

$$X\text{-}M^f_n M^h_m M^a_r\text{-}G$$

wherein X represents the residue of an initiator or hydrogen; $M^f$ represents units derived from fluorinated monomers; $M^h$ represents units derived from a non-fluorinated monomers; $M^a$ represents units having a silyl group represented by the formula:

$$-\underset{\underset{Y^6}{|}}{\overset{\overset{Y^4}{|}}{Si}}-Y^5$$

wherein each of $Y^4$, $Y^5$ and $Y^6$ independently represents an alkyl group, an aryl group or a hydrolyzable group; G is a monovalent organic group comprising the residue of a chain transfer agent; n represents a value of 1 to 100; m represents a value of 0 to 100;
r represents a value of 0 to 100; and n+m+r is at least 2.

11 Claims, No Drawings

METHOD OF RENDERING SUBSTRATES OIL AND WATER REPELLENT WITH A FLUOROCHEMICAL OLIGOMERIC SILANE

PRIORITY CLAIM

This application claims priority from EP Patent Application No. 01200207.7, filed on Jan. 19, 2001.

FIELD OF INVENTION

The present invention relates to fluorochemical compositions containing a fluorochemical silane dissolved or dispersed in an organic solvent. The fluorochemical silane is in particular an oligomeric fluorochemical silane. The invention further relates to a method of treatment of a substrate therewith.

BACKGROUND

Fluorochemical compounds are well known and commercially used to render various substrates oil- and water repellent and to provide other desirable properties thereto such as soil repellency and soil release. For example, U.S. Pat. Nos. 5,292,796 and 5,453,540 disclose certain fluorochemical oligomers for the treatment of substrates such as for example fibrous substrates. The oligomers disclosed are typically functionalised with an isocyanate group to cause reaction with the fibrous substrate surface.

Fluorochemical compounds including silanes are also known and commercially available. For example, FC 405 is a fluorochemical silane that is commercially available from 3M Company for rendering substrates such as glass or ceramics oil and water repellent.

U.S. Pat. No. 5,527,931 discloses aqueous dispersible oil and water repellent silane masonry penetrants to render such porous substrates oil and water repellent so as to enhance the cleanability thereof.

Fluorochemical compounds that can be applied from water are also known in the art. For example, U.S. Pat. No. 5,274,159 discloses a fluorochemical silane having hydrolysable polyoxyalkylene groups bonded to the silicone atom of the silyl groups. These groups are taught to hydrolyse in the presence of an acid or base catalyst after application to a substrate. However, the obtained oil- and water-repellency properties of the coated substrate and abrasion resistance leave room for further improvement.

U.S. Pat. No. 5,980,992 discloses fluorochemical silanes for the treatment of silicon-containing organic polymeric surfaces to restore the repellency thereof. The silicon-containing organic polymeric surfaces that become spent during their use can be coatings that are based on a fluorochemical oligomer that comprises silane groups.

Still further aqueous based fluorochemical compositions are disclosed in U.S. Pat. No. 5,550,184 and WO 99/29636. U.S. Pat. No. 5,550,184 discloses a hydrolysed silane emulsion obtained by emulsifying a hydrolysable perfluoroalkoxysilane in water in the presence of an emulsifier. WO 99/29636 discloses aqueous emulsions containing 1) a fluorocarbon silane hydrolysate generated in the presence of a surfactant and 2) a silicate, which provides a clear and smooth coated surface having water repellency and heat resistance when applied to a substrate.

Further disclosures on the treatment of substrates with silane containing compounds can be found in U.S. Pat. Nos. 5,442,011, and 4,927,950, WO 97/00230, U.S. Pat. No. 5,998,549 and WO 96/16630.

Despite the many known fluorochemical compositions for the treatment of surfaces, there continues to be a desire to find further beneficial fluorochemical compositions and in particular fluorochemical compositions for the treatment of hard surfaces. Preferably, such fluorochemical composition will have a high water repellency, high oil repellency and preferably have a high durability. Further desired properties are good stain resistance and/or stain release. Desirably, the compositions are easy to manufacture in a cost effective and convenient way. The compositions preferably display good repellency properties even when applied at low levels.

SUMMARY OF INVENTION

The present invention provides new fluorochemical oligomeric silanes, new fluorochemical compositions comprising such silanes, and methods for using such silanes and compositions to render substrates oil and water repellent.

The present invention provides a fluorochemical composition comprising a major amount of organic solvent and 0.05% by weight to 5% by weight of fluorochemical oligomer dispersed or dissolved in said organic solvent, said fluorochemical oligomer being represented by the general formula:

$$X\text{-}M^f_n M^h_m M^a_r\text{-}G \qquad (I)$$

wherein X represents the residue of an initiator or hydrogen; $M^f$ represents units derived from fluorinated monomers; $M^h$ represents units derived from a non-fluorinated monomers; $M^a$ represents units having a silyl group represented by the formula:

(II)

wherein each of $Y^4$, $Y^5$ and $Y^6$ independently represents an alkyl group, an aryl group or a hydrolyzable group; G is a monovalent organic group comprising the residue of a chain transfer agent; n represents a value of 1 to 100; m represents a value of 0 to 100; r represents a value of 0 to 100; and n+m+r is at least 2; with the proviso that at least one of the following conditions is fulfilled: (a) G is a monovalent organic group that contains a silyl group of the formula:

(III)

wherein $Y^1$, $Y^2$ and $Y^3$ each independently represents an alkyl group, an aryl group or a hydrolyzable group with at least one of $Y^1$, $Y^2$ and $Y^3$ representing a hydrolyzable group; or (b) r is at least 1 and at least one of $Y^4$, $Y^5$ and $Y^6$ represents a hydrolyzable group.

By the term 'major amount of organic solvent' in connection with the invention is meant that the composition generally contains at least 50% by weight, preferably at least 51% by weight of organic solvent.

The fluorochemical compositions of the present invention can be used to treat substrates and are capable of rendering such substrates oil and water repellent and/or to provide stain repellency thereto. The compositions are generally effective at low levels of application and have a good durability. The compositions are particularly useful for rendering substrates such as ceramics and glass water and/or oil repellent.

Accordingly, in a further aspect, the present invention relates to a method of treating a substrate, in particular ceramics or glass, comprising applying to the substrate the fluorochemical composition.

In a still further aspect, the present invention relates to new fluorochemical oligomeric silanes. In particular, the present invention provides a fluorochemical oligomer corresponding to the formula:

$$X\text{-}M^f_n M^h_m M^a_r\text{-}G \qquad (I)$$

wherein X represents the residue of an initiator or hydrogen;
$M^f$ represents units derived from fluorinated monomers having the formula:

$$C_4F_9\text{-}Q^2\text{-}E^1$$

wherein $E^1$ represents a free radical polymerizable group and $Q^2$ represents an organic divalent linking group;
$M^h$ represents units derived from non-fluorinated monomers;
$M^a$ represents units having a silyl group represented by the formula:

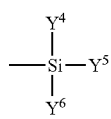

$$(II)$$

wherein each of $Y^4$, $Y^5$ and $Y^6$ independently represents an alkyl group, an aryl group or a hydrolyzable group, with the proviso that at least one of $Y^4$, $Y^5$ and $Y^6$ represents a hydrolyzable group;
G represents a monovalent organic group comprising the residue of a chain transfer agent;
n represents an integer of 1 to 100;
m represents an integer of 0 to 100;
r represents an integer of 0 to 100;
and n+m+r is at least 2;
with the proviso that at least one of the following conditions is fulfilled: (a) G is a monovalent organic group that contains a silyl group of the formula:

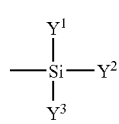

$$(III)$$

wherein $Y^1$, $Y^2$ and $Y^3$ each independently represents an alkyl group, an aryl group or a hydrolyzable group with at least one of $Y^1$, $Y^2$ and $Y^3$ representing a hydrolyzable group or (b) r is at least 1 and at least one of $Y^4$, $Y^5$ and $Y^6$ represents a hydrolyzable group.

Still further, the present invention provides a fluorochemical oligomer having the formula:

$$X\text{-}M^f_n M^h_m M^a_r\text{-}G \qquad (I)$$

wherein X represents the residue of an initiator or hydrogen;
$M^f$ represents units derived from fluorinated monomers;
$M^h$ represents units derived from non-fluorinated monomers;
$M^a$ represents units having the formula:

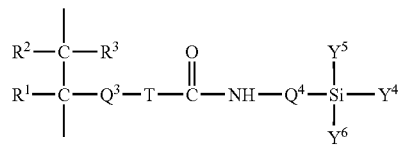

wherein $R^1$, $R^2$ and $R^3$ each independently represents hydrogen, an alkyl group, an aryl group or halogen, $Q^3$ represents an organic divalent linking group, T represents O or NR with R being hydrogen, an aryl or a $C_1$–$C_4$ alkyl group, and wherein each of $Y^4$, $Y^5$ and $Y^6$ independently represents an alkyl group, an aryl group or a hydrolyzable group, with the proviso that at least one of $Y^4$, $Y^5$ and $Y^6$ represents a hydrolyzable group;
G represents a monovalent organic group comprising the residue of a chain transfer agent;
n represents an integer of 1 to 100;
m represents an integer of 0 to 100;
r represents an integer of 1 to 100;
and n+m+r is at least 2.

The present invention also provides a fluorochemical oligomer having the formula:

$$X\text{-}M^f_n M^h_m M^a_r\text{-}G \qquad (I)$$

wherein X represents the residue of an initiator or hydrogen;
$M^f$ represents units derived from fluorinated monomers;
$M^h$ represents units derived from a non-fluorinated monomers;
$M^a$ represents units having a silyl group represented by the formula:

$$(II)$$

wherein each of $Y^4$, $Y^5$ and $Y^6$ independently represents an alkyl group, an aryl group or a hydrolyzable group, with the proviso that at least one of $Y^4$, $Y^5$ and $Y^6$ represents a hydrolyzable group;
G corresponds to the formula:

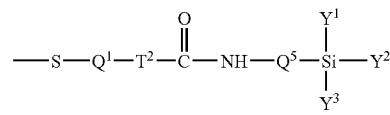

wherein $Q^1$ and $Q^5$ each independently represents an organic divalent linking group, $T^2$ represents O or NR with R being hydrogen, an aryl or a $C_1$–$C_4$ alkyl group, and $Y^1$, $Y^2$ and $Y^3$ each independently represents an alkyl group, an aryl group or a hydrolyzable group with at least one of $Y^1$, $Y^2$ and $Y^3$ representing a hydrolyzable group;
n represents an integer of 1 to 100;
m represents an integer of 0 to 100;
r represents an integer of 0 to 100;
and n+m+r is at least 2.

DETAILED DESCRIPTION OF ILLUSTRATIVE EMBODIMENTS

The fluorochemical silanes for use in the present invention, are generally oligomers that can be prepared by free-radical oligomerization of a fluorochemical monomer in the presence of a chain transfer agent. The oligomers should also include one or more silyl groups that have one or more hydrolyzable groups. The hydrolyzable groups are generally capable of hydrolyzing under appropriate conditions, e.g., under acidic or basic conditions, such that the fluorochemical silane can be caused to react with the substrate and/or undergo condensation reactions to provide for a durable coating on the substrate. Illustrative examples of hydrolyzable groups include halogens such as chlorine, alkoxy groups, aryloxy groups, acyl groups and acyloxy groups. The thus formed coating can display the desired oil and water repellent properties. The silyl groups having one or more hydrolysable groups can be included in the fluorochemical silane by copolymerising the fluorochemical monomer with a monomer having a silyl group that has one or more hydrolyzable groups or through the use of chain transfer agent that includes such a silyl group. Alternatively, a functionalised chain transfer agent or functionalised comonomer can be used which can be reacted with a reagent having a silyl group having one or more hydrolyzable groups subsequent to the oligomerization.

The total number of units represented by the sum of n, m and r is generally at least 2 and preferably at least 3 so as to render the compound oligomeric. The value of n in the fluorochemical oligomer is typically between 1 and 100 and preferably between 2 and 20. The values of m and r are typically between 0 and 100 and preferably between 1 and 30. According to a preferred embodiment, the value of m is less than that of n and n+m+r is at least 2.

The fluorochemical silanes typically have an average molecular weight between 400 and 100000, preferably between 600 and 20000. The fluorochemical silane preferably contains at least 10 mole % (based on total moles of units $M^f$, $M^h$ and $M^a$) of hydrolysable groups.

It will further be appreciated by one skilled in the art that the preparation of fluorochemical silanes according to the present invention results in a mixture of compounds and accordingly, general formula (I) should be understood as representing a mixture of compounds whereby the indices n, m and r in formula I represent the molar amount of the corresponding unit in such mixture. Accordingly, it will be clear that n, m and r can be fractional values.

The units $M^f$ of the fluorochemical silane are generally derived from fluorochemical monomers corresponding to the formula:

$$R_f\text{-}Q\text{-}E^1 \qquad (IV)$$

wherein $R_f$ represents a fluoroaliphatic group containing at least 3 carbon atoms or a fluorinated polyether group. Q represents an organic divalent linking group and $E^1$ represents a free radical polymerizable group.

The fluoroaliphatic group $R_f$ in the fluorochemical monomer, is a fluorinated, stable, inert, preferably saturated, non-polar, monovalent aliphatic radical. It can be straight chain, branched chain, or cyclic or combinations thereof. It can contain heteroatoms such as oxygen, divalent or hexavalent sulfur, or nitrogen. $R_f$ is preferably a fully-fluorinated radical but hydrogen or chlorine atoms can be present as substituents if not more than one atom of either is present for every two carbon atoms. The $R_f$ radical typically has at least 3 and up to 18 carbon atoms, preferably 3 to 14, especially 4 to 10 carbon atoms, and preferably contains about 40% to about 80% fluorine by weight, more preferably about 50% to about 79% fluorine by weight. The terminal portion of the $R_f$ radical is a perfluorinated moiety, which will preferably contain at least 7 fluorine atoms, e.g., $CF_3CF_2CF_2$—, $(CF_3)_2CF$—, $F_5SCF_2$—. The preferred $R_f$ radicals are fully or substantially fluorinated and are preferably those perfluorinated aliphatic radicals of the formula $C_nF_{2n+1}$— where n is 3 to 18, particularly 4 to 10. Compounds wherein the $R_f$ radical is a $C_4F_9$— are generally more environmentally friendly than compounds where the $R_f$ radical consists of a perfluorinated group with more carbon atoms. Surprisingly, despite the short $C_4$ perfluorinated group, the fluorochemical oligomeric silanes prepared therewith are highly effective.

The $R_f$ group can also be a perfluoropolyether group. The perfluoropolyether group $R_f$ can include linear, branched, and/or cyclic structures, that may be saturated or unsaturated, and substituted with one or more oxygen atoms. It is preferably a perfluorinated group (i.e., all C—H bonds are replaced by C—F bonds). More preferably, it includes perfluorinated repeating units selected from the group of —$(C_nF_{2n})$—, —$(C_nF_{2n}O)$—, —$(CF(Z))$—, —$(CF(Z)O)$—, —$(CF(Z)C_nF_{2n}O)$—, —$(C_nF_{2n}CF(Z)O)$—, —$(CF_2CF(Z)O)$—, and combinations thereof. In these repeating units Z is a perfluoroalkyl group, an oxygen-substituted perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. The terminal groups can be $(C_nF_{2n+1})$—, $(C_nF_{2n+1}O)$— or $(X'C_nF_{2n}O)$—, wherein X' is H, Cl, or Br, for example. Preferably, these terminal groups are perfluorinated. In these repeating units or terminal groups, n is 1 or more, and preferably about 1 to about 4. Particularly preferred approximate average structures for a perfluoropolyether group include $C_3F_7O(CF(CF_3)CF_2O)_pCF(CF_3)$— and $CF_3O(C_2F_4O)_pCF_2$— wherein an average value for p is 1 to about 50. As synthesized, these compounds typically include a mixture of polymers. The approximate average structure is the approximate average of the mixture of polymers.

$M^f$ in formula I can also be derived from a difunctional fluorochemical monomer corresponding to the formula:

$$E^a\text{-}Q^a\text{-}R^1_f\text{-}Q^b\text{-}E^b \qquad (V)$$

wherein $Q^a$ and $Q^b$ each independently represents an organic divalent linking group and $E^a$ and $E^b$ each independently represent a free radical polymerizable group. $R^1_f$ represents a divalent perfluoropolyether group such as, for example, —$(CF(CF_3)CF_2O)_p$—, —$(CF_2O)_p(CF_2CF_2O)_q$—, —$CF(CF_3)(CF_2CF(CF_3)O)_pCF(CF_3)O$—, —$(CF_2O)_p(CF_2CF_2O)_qCF_2$—, —$(CF_2CF_2O)_p$—, —$(CF_2CF_2CF_2O)_p$—, wherein an average value for p and q is 1 to about 50. The molecular weight of the difunctional fluorochemical monomer should generally be between about 200 and 3000, more preferably between 300 and 2500. The amount of difunctional fluorochemical monomer used should be chosen so as to obtain a composition which is soluble or dispersible in an organic solvent in an amount of at least 0.05% by weight.

The linking groups Q, $Q^a$ and $Q^b$ in the above formulas (IV) and (V) link the fluoroaliphatic or the fluorinated polyether group $R_f$ or $R^1_f$ to the free radical polymerizable group $E^1$, $E^a$ or $E^b$ and are generally non-fluorinated organic linking groups. The linking groups preferably contain from 1 to about 20 carbon atoms and may optionally contain oxygen, nitrogen, or sulfur-containing groups or a combination thereof. The linking groups are preferably free of functional groups that substantially interfere with free-radical oligomerization (e.g., polymerizable olefinic double bonds, thiols, and other such functionality known to those skilled in the art). Illustrative examples of suitable linking groups Q include straight chain, branched chain or cyclic alkylene, arylene, aralkylene, oxy, oxo, hydroxy, thio, sulfonyl, sulfoxy, amino, imino, sulfonamido, carboxyamido, carbonyloxy, urethanylene, ureylene, and combinations thereof such as sulfonamidoalkylene. Preferred linking groups are selected from the group consisting of alkylene and an organic divalent linking group according to the following formulae:

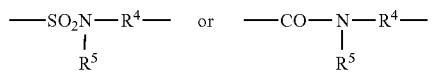

wherein $R^4$ represents a hydrogen or a linear or branched alkylene having 2 to 4 carbon atoms and R5 represents a hydrogen or an alkyl having 1 to 4 carbon atoms. $E^1$, $E^a$ and $E^b$ are free radically polymerizable groups that typically contain an ethylenically unsaturated group capable of undergoing a free radical polymerization. Suitable groups include, for example, moieties derived from vinyl ethers, vinyl esters, allyl esters, vinyl ketones, styrene, vinyl amide, acrylamides, maleates, fumarates, acrylates and methacrylates. Of these, the esters of alpha, beta unsaturated acids, such as the acrylates and methacrylates are preferred.

Fluorochemical monomers $R_f$-Q-$E^1$ as described above and methods for the preparation thereof are known and disclosed, e.g., in U.S. Pat. No. 2,803,615. Illustrative examples of such compounds include general classes of fluorochemical acrylates, methacrylates, vinyl ethers, and allyl compounds containing fluorinated sulfonamido groups, acrylates or methacrylates derived from fluorochemical telomer alcohols, acrylates or methacrylates derived from fluorochemical carboxylic acids, and perfluoroalkyl acrylates or methacrylates as disclosed in EP-A-526 976. Fluorinated polyetheracrylates or methacrylates suitable for use herein are described in U.S. Pat. No. 4,085,137.

Preferred examples of fluorochemical monomers include:
$CF_3(CF_2)_3CH_2OCOC(CH_3)=CH_2$
$CF_3(CF_2)_3CH_2OCOCH=CH_2$
$CF_3(CF_2)_7(CH_2)_2OCOCH=CH_2$
$CF_3(CF_2)_7(CH_2)_2OCOC(CH_3)=CH_2$

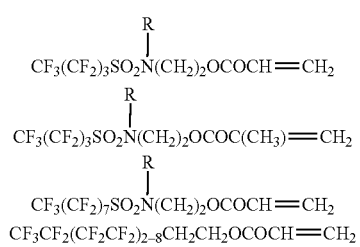

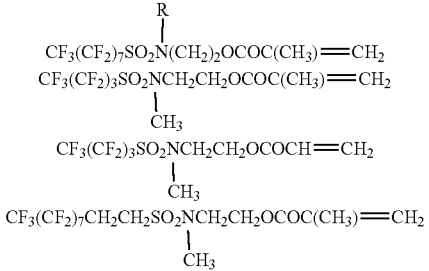

$CF_3O(CF_2CF_2)_uCH_2OCOCH=CH_2$
$CF_3O(CF_2CF_2)_uCH_2OCOC(CH_3)=CH_2$
$C_3F_7O(CF(CF_3)CF_2O)_uCF(CF_3)CH_2OCOCH=CH_2$
$C_3F_7O(CF(CF_3)CF_2O)_uCF(CF_3)CH_2OCOC(CH_3)=CH_2$
$CH_2=CH-OCOCH_2CF_2(OCF_2)_u(OCF_2CF_2)_vOCF_2CH_2OCOCH=CH_2$
$CH_2=C(CH_3)-OCOCH_2CF_2(OCF_2)_u(OCF_2CF_2)_vOCF_2CH_2OCOC(CH_3)=CH_2$

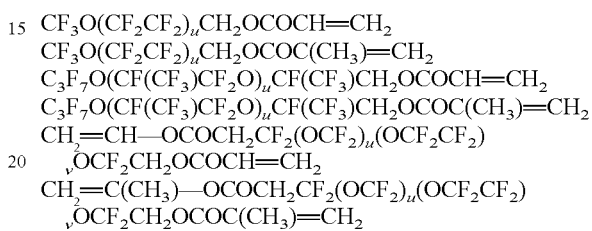

wherein R represents methyl, ethyl or n-butyl and u and v are about 1 to 50.

The units $M^h$ of the fluorochemical silane (when present) are generally derived from a non-fluorinated monomer, preferably a monomer consisting of a polymerizable group and a hydrocarbon moiety. Hydrocarbon group containing monomers are well known and generally commercially available. Useful hydrocarbon containing monomers include those according to formula:

$$R^h\text{-}Q^6_s\text{-}E^3 \tag{VI}$$

wherein $R^h$ represents a hydrocarbon group, $Q^6$ is a divalent linking group, s is 0 or 1 and $E^3$ is a free radical polymerizable group. Illustrative examples of linking groups $Q^6$ include oxy, carbonyl, carbonyloxy, carbonamido, sulphonamido, oxyalkylene and poly(oxyalkylene).

Illustrative examples of non-fluorinated monomers from which the units $M^h$ can be derived include general classes of ethylenic compounds capable of free-radical polymerization, such as, for example, allyl esters such as allyl acetate and allyl heptanoate; alkyl vinyl ethers or alkyl allyl ethers such as cetyl vinyl ether, dodecylvinyl ether, 2-chloroethylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and their esters such as vinyl, allyl, methyl, butyl, isobutyl, hexyl, heptyl, 2-ethylhexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha,beta-unsaturated carboxylic acid derivatives such as allyl alcohol, allyl glycolate, acrylamide, methacrylamide, n-diisopropyl acrylamide, diacetoneacrylamide, N,N-diethylaminoethylmethacrylate, N-t-butylamino ethyl methacrylate; styrene and its derivatives such as vinyltoluene, alpha-methylstyrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene, and allyl or vinyl halides such as vinyl and vinylidene chloride. Preferred non-fluorinated monomers include hydrocarbon group containing monomers such as those selected from octadecylmethacrylate, laurylmethacrylate, butylacrylate, N-methylol acrylamide, isobutylmethacrylate, ethylhexyl acrylate and ethylhexyl methacrylate; and vinylcloride and vinylidene chloride.

The fluorochemical silane of the invention generally further includes units $M^a$ that have a silyl group that has one or more hydrolysable groups. Illustrative examples of units $M^a$ include those that correspond to the general formula:

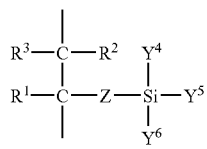

(VII)

wherein $R^1$, $R^2$ and $R^3$ each independently represents hydrogen, an alkyl group such as for example methyl or ethyl, halogen or an aryl group, Z represents an organic divalent linking group and $Y^4$, $Y^5$ and $Y^6$ independently represent an alkyl group, an aryl group, or a hydrolysable group.

Such units $M^a$ may be derived from a monomer represented by the formula:

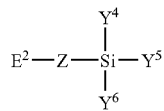

(VIII)

wherein each of $Y^4$, $Y^5$ and $Y^6$ independently represents an alkyl group, an aryl group, or a hydrolysable group; Z represents a chemical bond or an organic divalent linking group and $E^2$ represents a free radical polymerizable group such as for example listed above with respect to $E^1$. Alternatively such units $M^a$ according to formula VII can be obtained by reacting a functionalized monomer with a silyl group containing reagent as will be described furthereon. By the term "functionalised monomer" is meant a monomer that has one or more groups available for subsequent reaction, for example a group capable of undergoing a condensation reaction. Typically, the functionalised monomer is a monomer that has one or more groups capable of reacting with an isocyanate or epoxy groups. Specific examples of such groups include hydroxy and amino groups.

When Z represents an organic divalent linking group, it preferably contains from 1 to about 20 carbon atoms. Z can optionally contain oxygen, nitrogen, or sulfur-containing groups or a combination thereof, and Z is preferably free of functional groups that substantially interfere with free-radical oligomerization (e.g., polymerizable olefinic double bonds, thiols, and other such functionality known to those skilled in the art). Illustrative examples of suitable linking groups Z include straight chain, branched chain or cyclic alkylene, arylene, aralkylene, oxyalkylene, carbonyloxyalkylene, oxycarboxyalkylene, carboxyamidoalkylene, urethanylenealkylene, ureylenealkylene and combinations thereof. Preferred linking groups are selected from the group consisting of alkylene, oxyalkylene and carbonyloxyalkylene. According to a particularly preferred embodiment, the linking group Z corresponds to the formula:

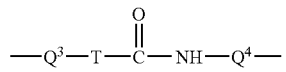

wherein $Q^3$ and $Q^4$ independently represents an organic divalent linking group. Illustrative examples of organic divalent linking groups $Q^3$ include for example an alkylene, an arylene, oxyalkylene, carbonyloxyalkylene, oxycarboxyalkylene, carboxyamidoalkylene, urethanylenealkylene and ureylenealkylene. Illustrative examples of organic divalent linking groups $Q^4$ include for example alkylene and arylene. T represents O or NR wherein R represents hydrogen, a $C_1$-$C_4$ alkyl group or an aryl group.

$Y^4$, $Y^5$ and $Y^6$ independently represents an alkyl group, an aryl group or a hydrolysable group.

Illustrative examples of monomers according to formula VIII include vinyltrichlorosilane, vinyltrimethoxysilane, vinyltriethoxysilane and alkoxysilane functionalised acrylates or methacrylates, such as methacryloyloxypropyl trimethoxysilane.

The fluorochemical silane is conveniently prepared through a free radical polymerization of a fluorinated monomer with optionally a non-fluorinated monomer and a monomer containing the silyl group in the presence of a chain transfer agent. A free radical initiator is generally used to initiate the polymerization or oligomerization reaction. Commonly known free-radical initiators can be used and examples thereof include azo compounds, such as azobisisobutyronitrile (ABIN), azo-2-cyanovaleric acid and the like, hydroperoxides such as cumene, t-butyl and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide.

The oligomerization reaction can be carried out in any solvent suitable for organic free-radical reactions. The reactants can be present in the solvent at any suitable concentration, e.g., from about 5 percent to about 90 percent by weight based on the total weight of the reaction mixture. Illustrative examples of suitable solvents include aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), alcohols (e.g., ethanol, isopropyl alcohol), ketones (e.g., acetone, methylethyl ketone, methyl isobutyl ketone), sulfoxides (e.g., dimethyl sulfoxide), amides (e.g., N,N-dimethylformamide, N,N-dimethylacetamide), halogenated solvents such as methylchloroform, FREON™113, trichloroethylene, α,α,α-trifluorotoluene, and the like, and mixtures thereof.

The oligomerization reaction can be carried out at any temperature suitable for conducting an organic free-radical reaction. Particular temperature and solvents for use can be easily selected by those skilled in the art based on considerations such as the solubility of reagents, the temperature required for the use of a particular initiator, molecular weight desired and the like. While it is not practical to enumerate a particular temperature suitable for all initiators and all solvents, generally suitable temperatures are between about 30° C. and about 200° C.

The fluorochemical oligomer is prepared in the presence of chain transfer agent. Suitable chain transfer agents typically include a hydroxy-, amino-, mercapto or halogen group. The chain transfer agent may include two or more of such hydroxy, amino-, mercapto or halogen groups. Illustrative examples of chain transfer agents useful in the preparation of the fluorochemical oligomer include those selected from 2-mercaptoethanol, 3-mercapto-2-butanol, 3-mercapto-2-propanol, 3-mercapto-1-propanol, 3-mercapto-1,2-propanediol, 2-mercapto-ethylamine, di(2-mercaptoethyl)sulfide, octylmercaptane and dodecylmercaptane.

In a preferred embodiment a chain transfer agent containing a silyl group having one or more hydrolyzable groups is used in the oligomerization to produce the fluorochemical oligomer. Chain transfer agents including such a silyl group include those according to formula IX.

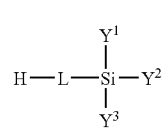

IX wherein $Y^1$, $Y^2$ and $Y^3$ each independently represents an alkyl group, preferably a $C_1$–$C_8$ alkyl group such as methyl, ethyl or propyl or an alkyl group containing a cycloalkyl such as cyclohexyl or cylcopentyl, an aryl group such as phenyl, an alkylaryl group or an aralkyl group, a hydrolysable group such as for example halogen or alkoxy group such as methoxy, ethoxy or aryloxy group, with at least one of $Y^1$, $Y^2$ and $Y^3$ representing a hydrolysable group. L represents a divalent linking group.

Preferred chain transfer agents are those in which L represents —S-$Q^1$- with $Q^1$ being linked to the silicone atom in formula IX and wherein $Q^1$ represents an organic divalent linking group such as for example a straight chain, branched chain or cyclic alkylene, arylene or aralkylene. The use of such chain transfer agent will generally result in fluorochemical oligomers in which the monovalent organic group G corresponds to the following formula:

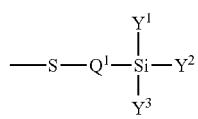

wherein $Y^1$, $Y^2$, $Y^3$ and $Q^1$ have the meaning as defined above.

A single chain transfer agent or a mixture of different chain transfer agents may be used. The preferred chain transfer agents are 2-mercaptoethanol, octylmercaptane and 3-mercaptopropyltrimethoxysilane. A chain transfer agent is typically present in an amount sufficient to control the number of polymerized monomer units in the oligomer and to obtain the desired molecular weight of the oligomeric fluorochemical silane. The chain transfer agent is generally used in an amount of about 0.05 to about 0.5 equivalents, preferably about 0.25 equivalents, per equivalent of monomer including fluorinated and non-fluorinated monomers.

The fluorochemical silane of the present invention contains one or more hydrolyzable groups. These hydrolysable groups may be introduced in the fluorochemical silane by oligomerising in the presence of a chain transfer agent having a silyl group containing one or more hydrolysable groups, for example a chain transfer agent according to formula IX above wherein at least one of $Y^1$, $Y^2$ and $Y^3$ represents a hydrolysable group and/or by co-oligomerising with a monomer containing a silyl group having one or more hydrolysable groups such as a monomer according to formula VIII above wherein at least one of $Y^4$, $Y^5$ and $Y^6$ represents a hydrolysable group. Alternatively, a functionalised chain transfer agent or functionalised comonomer can be used which can be reacted with a silyl group containing reagent subsequent to the oligomerization.

Thus, according to a first embodiment a fluorochemical silane is prepared by oligomerizing a fluorinated monomer with a monomer according to formula VIII above wherein at least one of $Y^4$, $Y^5$ and $Y^6$ represents a hydrolysable group in the presence of a chain transfer agent which may optionally also contain a silyl group such as for example a chain transfer agent according to formula IX above wherein at least one of $Y^1$, $Y^2$ and $Y^3$ represents a hydrolysable group.

As a variation to the above method the oligomerization may be carried out without the use of the silyl group containing monomer but with a chain transfer agent containing the silyl group.

A further embodiment for producing the fluorochemical silane, involves the polymerisation or oligomerisation of one or more fluorinated monomers and a functionalised monomer in the presence of a chain transfer agent. Illustrative examples of such monomers include hydroxy or amino functionalised acrylate or methacrylates, such as 2-hydroxyethyl(meth)acrylate, 3-hydroxypropyl(meth)acrylate, 6-hydroxyhexyl(meth)acrylate and the like. Alternative to or in addition to the use of functionalised monomer, a functionalised chain transfer agent can be used. By the term "functionalised chain transfer agent" is meant a chain transfer agent that has one or more groups available for subsequent reaction, for example a group capable of undergoing a condensation reaction. Typically, the functionalised chain transfer agent is a chain transfer agent that has one or more groups capable of reacting with an isocyanate or epoxy groups. Specific examples of such groups include hydroxy and amino groups. Illustrative examples of such chain transfer agents include 2-mercaptoethanol, 3-mercapto-2-butanol, 3-mercapto-2-propanol, 3-mercapto-1-propanol and 3-mercapto-1,2-propanediol and 2-mercapto-ethylamine. Subsequent to the oligomerisation the functional group contained in the comonomer and/or chain transfer agent can be reacted with a compound including a silyl group having hydrolysable groups and that is capable of reacting with the functional group contained in the comonomer and/or chain transfer agent.

Suitable compounds for reacting with the functional groups included in the monomer or chain transfer agent include compounds according to the following formula:

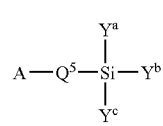

X wherein A represents a functional group capable of undergoing a condensation reaction with the functional group contained in the monomer or chain transfer agent, in particular a functional group capable of condensing with a hydroxy or amino functional oligomer, examples of A include an isocyanate or an epoxy group; $Q^5$ represents an organic divalent linking group; $Y^a$, $Y^b$ and $Y^c$ each independently represents an alkyl group, preferably a $C_1$–$C_8$ alkyl group such as methyl, ethyl or propyl or an alkyl group containing a cycloalkyl such as cyclohexyl or cylcopentyl, an aryl group such as phenyl, an alkylaryl group or an aralkyl group or hydrolysable group such as for example halogen, an alkoxy group such as methoxy, ethoxy or an aryloxy group and at least one of $Y^a$, $Y^b$ and $Y^c$ represents a hydrolysable group.

The organic divalent linking groups $Q^5$ include preferably contains from 1 to about 20 carbon atoms. $Q^5$ can optionally contain oxygen, nitrogen, or sulfur-containing groups or a combination thereof Illustrative examples of suitable linking groups $Q^5$ include straight chain, branched chain or cyclic alkylene, arylene, aralkylene, oxyalkylene, carbonyloxyalkylene, oxycarboxyalkylene, carboxyamidoalkylene, urethanylenealkylene, ureylenealkylene and combinations thereof Preferred linking groups are selected from the group consisting of alkylene, oxyalkylene and carbonyloxyalkylene.

Illustrative examples of compounds according to formula X include 3-isocyanatopropyltrimethoxysilane and 3-epoxypropyltrimethoxysilane. When a hydroxy or amino functionalised chain transfer agent is used that is subsequently reacted with a compound according to formula X wherein A is an isocyanato group, the resulting monovalent organic group G in the fluorochemical compound can generally be represented by the formula:

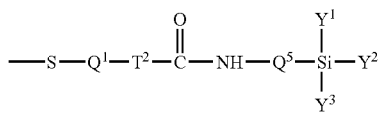

wherein $Q^1$, $Q^5$, $Y^1$, $Y^2$ and $Y^3$ have the meaning as defined above and $T^2$ represents O or NR with R being hydrogen, an aryl or a $C_1$–$C_4$ alkyl group.

The condensation reaction is carried out under conventional conditions well-known to those skilled in the art. Preferably the reaction is run in the presence of a catalyst. Illustrative examples of suitable catalysts include tin salts such as dibutyltin dilaurate, stannous octanoate, stannous oleate, tin dibutyldi-(2-ethyl hexanoate), stannous chloride; and others known to those skilled in the art. The amount of catalyst present will depend on the particular reaction, and thus it is not practical to recite particular preferred concentrations. Generally, however, suitable catalyst concentrations are from about 0.001 percent to about 10 percent, preferably about 0.1 percent to about 5 percent, by weight based on the total weight of the reactants.

The condensation reaction is preferably carried out under dry conditions in a polar solvent such as ethyl acetate, acetone, methyl isobutyl ketone, toluene and the like. Suitable reaction temperatures will be easily determined by those skilled in the art based on the particular reagents, solvents, and catalysts being used. Suitable temperatures are typically between about room temperature and about 120 deg. C.

A composition of the present invention includes a major amount of organic solvent. The amount of organic solvent in the composition is generally at least 50% by weight, typically at least 51% by weight, preferably at least 60% by weight and more preferably at least 80% by weight of the total weight of the composition. The organic solvent may comprise a single organic solvent or a mixture of two or more organic solvents. The solvent(s) used in the composition preferably include those that are substantially inert (i.e., substantially nonreactive with the fluorinated silane). Suitable organic solvents, or mixtures of solvents can be selected from aliphatic alcohols, having 1 to 4 carbon atoms, such as methanol, ethanol, isopropylalcohol; ketones such as acetone or methyl ethyl ketone; esters, such as ethyl acetate; ethers, such as diethyl ether, diisopropylether and methyl t-butylether and halogenated solvents including fluorinated solvents. Illustrative examples of suitable fluorinated solvents include fluorinated hydrocarbons, such as perfluorooctane; partially fluorinated hydrocarbons, such as pentafluorobutane; and hydrofluoroethers, such as methyl perfluorobutyl ether and ethyl perfluorobutyl ether. Various blends of fluorinated organic solvents with non-fluorinated organic solvents or other halogenated solvents can be used.

The coating composition of the invention, comprising fluorochemical silanes, is typically a relatively diluted solvent composition, containing between 0.01 and 5 percent by weight of the fluorochemical silane, more preferably, between 0.03 and 3 percent by weight of the fluorochemical silane, and most preferably, between 0.1 and 2 percent by weight of the fluorochemical silane. The coating composition may contain water, crosslinking agents and other additives, such as silica or known water extenders, such as titanates or zirconates. The coating composition may contain further components such as for example hydrocarbon silanes, i.e., silanes that are substantially non-fluorinated. However, the addition of hydrocarbon silanes is preferably kept below about 1% by weight, in order not to adversely affect the oil repellency properties of the composition.

The hydrolysable fluorochemical silane can be used to treat substrates so as to render these oil and water repellent and/or to provide stain repellency to such substrates. Suitable substrates that can be treated in a particularly effective way with the fluorochemical silanes of this invention include fibrous substrates and substrates having a hard surface that preferably has groups capable of reacting with the fluorochemical silane according to formula (I). Preferably, such reactivity of the surface of the substrate is provided by active hydrogen atoms. When such active hydrogen atoms are not present, the substrate may first be treated in a plasma containing oxygen or in a corona atmosphere to make them reactive to the fluorochemical silane. Particularly preferred substrates include ceramics, glass, metal, natural and man-made stone, thermoplastic materials (such as poly(meth) acrylate, polycarbonate, polystyrene, styrene copolymers, such as styrene acrylonitrile copolymers, polyesters, polyethylene terephtalate), paints (such as those on acrylic resins), powder coatings (such as polyurethane or hybrid powder coatings), and wood. Various articles can be effectively treated with the fluorochemical silane solution of the present invention to provide a water and oil repellent coating thereon. Examples include ceramic tiles, bathtubs or toilet pots, glass shower panels, construction glass, various parts of a vehicle (such as the mirror or windscreen), glass, ceramic or enamel pottery materials.

Treatment of the substrates results in rendering the treated surfaces less retentive of soil and more readily cleanable due to the oil and water repellent nature of the treated surfaces.

These desirable properties are maintained despite extended exposure or use and repeated cleanings because of the high degree of durability of the treated surface as can be obtained through the compositions of this invention.

The amount of hydrolysable fluorochemical silane to be coated on the substrate will generally be that amount sufficient to produce a coating which is water and oil repellent, such as a coating having at 20° C. a contact angle with distilled water of at least 80°, and a contact angle with n-hexadecane of at least 40°, measured after drying and curing of the coating. This coating can be extremely thin, e.g. 1 to 50 molecular layers, though in practice a useful coating may be thicker.

Preferably, the substrate should be clean prior to applying the compositions of the invention so as to obtain optimum characteristics, particularly durability. That is, the surface of the substrate to be coated should be substantially free of organic contamination prior to coating. Cleaning techniques depend on the type of substrate and include, for example, a solvent washing step with an organic solvent, such as acetone or ethanol.

A wide variety of coating methods can be used to apply a composition of the present invention, such as brushing, spraying, dipping, rolling, spreading, and the like. A preferred coating method for application of a fluorochemical silane of the present invention includes spray application. Generally, the fluorochemical silane coating on the substrate will be subjected to heat. To effect heating, a substrate to be coated can typically be preheated at a temperature of for example between 60° C. and 150° C. This is of particular interest for industrial production, where eg. ceramic tiles can be treated immediately after the baking oven at the end of the production line. Alternatively, the substrate to be coated can be contacted with the treating composition at room temperature (typically, about 20° C. to about 25° C.) and subsequently dried at elevated temperature of e.g. 40° to 300° C. Acid or base catalysed condensation to remove the hydrolysable groups, can be done during or after application of the coating. The treated substrate is polished in a last step of the treatment procedure.

To achieve good hydrophobicity and durability, organic or inorganic acid or base catalyst should preferably be used. Organic acids include acetic acid, citric acid, formic acid, triflic acid, perfluorobutyric acid and the like. Examples of inorganic acids include sulphuric acid, hydrochloric acid and the like. Examples of useful amines include sodium hydroxide, potassium hydroxide and triethylamine. The acid or base catalysed condensation will generally be applied to the coating after drying as a water based solution comprising between about 0.01 and 10%, more preferably between 0.05 and 5% by weight of the catalyst. Alternatively, the acid or base can be added to the coating composition shortly before application thereof to the substrate.

Although the inventor does not wish to be bound by this theory, compounds of the above mentioned formula I are believed to undergo reaction with the substrate surface to form a siloxane layer. For the preparation of a durable hydrophobic coating, an acid or a base catalyst should be present in order to facilitate hydrolysis of the silane end groups, and then condensation of the resulting silanol groups on and to the substrate. In this context, "siloxane" refers to —Si—O—Si— bonds to which are attached fluorochemical oligomer segments as given in formula I. A coating prepared from a coating composition that includes compounds of formula I can also include unreacted or uncondensed silanol groups.

EXAMPLES

The following examples further illustrate the invention without the intention however to limit the invention thereto. All parts are by weight unless indicated otherwise.

Abbreviations

AcA: acetic acid, available from Aldrich
MeFOSEMA: N-methyl perfluorooctyl sulfonamido ethylmethacrylate
MeFOSEA: N-methyl perfluorooctyl sulfonamido ethylacrylate
MeFBSEA: N-methyl perfluorobutyl sulfonamido ethylacrylate
MeFOSE: N-methyl perfluorooctyl sulfonamido ethanol
ODMA: octadecylmethacrylate
isoBMA: iso-butylmethacrylate
A-174: $CH_2=C(CH_3)C(O)O(CH_2)_3Si(OCH_3)_3$, available from Aldrich
A-160: $HS(CH_2)_3Si(OCH_3)_3$, available from Aldrich
FC-405: solvent based fluorochemical available from 3M
Telomer acrylate: $C_nF_{2n+1}CH_2CH_2OC(O)CH=CH_2$, with n in average is about 9.4

Methods of Application and Testing

Coating Method

In a first step, the substrates were cleaned and degreased with acetone. After cleaning, 0.1 to 1% solutions of fluorochemical silanes as given in the respective examples were applied onto the substrates, by dip coating for 2 minutes. The substrates were rinsed in a water bath and then dipped with a 3% solution of acetic acid in water for 1 minute. During this cleaning step, the initial hydrophilic coating transformed into a hydrophobic coating. After rinsing with water, the substrates were dried and cured at 150° C. during 5 minutes.

Contact Angles

The treated substrates were tested for their contact angles versus water (W) and n-hexadecane (O) using an Olympus TGHM goniometer. The contact angles were measured before (initial) and directly after abrasion (abrasion). The values are the mean values of 4 measurements and are reported in degrees. The minimum measurable value for a contact angle was 20°. A value <20° meant that the liquid spread on the surface.

Abrasion Test

The treated substrates were abraded using an AATCC Crockmeter, using sandpaper nr. 600 (available from 3M). 20 abrasion cycles were done.

Spray Test (SR)

The spray rating of a treated substrate is a value indicative of the dynamic repellency of the treated substrate to water that impinges on the treated substrate. The repellency was measured by Standard Test Number 22, published in the 1985 Technical Manual and Yearbook of the American Association of Textile Chemists and Colorists (AATCC), and was expressed in terms of 'spray rating' of the tested substrate. The spray rating was obtained by spraying 250 ml water on the substrate from a height of 15 cm. The wetting pattern was visually rated: using a 0 to 100 scale, where 0 meant complete wetting and 100 meant no wetting at all.

Synthesis of Fluorochemical Silanes (FCSIL-1 to FCSIL-7)

Several fluorochemical silanes as given in table 1 were prepared similar to the synthesis of MeFOSEMA/ODMA/ mercaptosilane (molar ratio: 2/2/1) (FCSIL-1):

In a three-necked flask of 500 ml, fitted with a condenser, stirrer and thermometer, were placed 32.5 g (0.052 mol) MeFOSEMA, 17.5 g (0.052 mol) ODMA, 5.1 g (0.0259 mol) A-160, 130 g ethylacetate and 0.1 g ABIN.

The mixture was degassed three times using aspirator vacuum and nitrogen pressure. The mixture was reacted under nitrogen at 75° C. during 8 hours. An additional 0.05 g ABIN was added and the reaction was continued for another 3 hrs at 75° C. A clear solution of the oligomeric fluorochemical silane MeFOSEMA/ODMA/A-160 in a molar ratio of about 2/2/1 was obtained.

Further fluorochemical silanes were prepared using above procedure, using molar ratios of reactants as indicated in table 1.

TABLE 1

Composition of fluorochemical silanes

| FCSIL | Composition | Molar ratio |
| --- | --- | --- |
| 1 | MeFOSEMA/ODMA/A-160 | 2/2/1 |
| 2 | MeFOSEA/A-160 | 4/1 |
| 3 | MeFOSEMA/ODMA/A-160 | 10/10/1 |
| 4 | MeFOSEA/isoBMA/A-160 | 3.2/0.8/1 |
| 5 | MeFOSEMA/ODMA/A-160 | 20/20/1 |
| 6 | MeFOSEMA/ODMA/A-174/A-160 | 20/18/2/1 |
| 7 | MeFBSEA/A-160 | 4/1 |
| C-FC-1 | MeFOSEA/HSCH$_2$CH$_2$OH | 4/1 |

Synthesis of Fluorochemical Silanes (FCSIL-8 to FCSIL-14)

Several fluorochemical silanes as given in table 2 were prepared similar to the synthesis of FCSIL-8:

In a first step, a fluorochemical oligomer MeFOSEA/HSCH$_2$CH$_2$OH (molar ratio 4/1) was made according to the following procedure:

A 3 l reaction flask, equipped with 2 reflux condensers, a mechanical teflon blade stirrer, a thermometer, a nitrogen inlet and vacuo outlet, was charged with 2.4 moles MeFO-SEA and 987 g ethylacetate. The mixture was heated to 40° C. until all fluorochemical monomer was dissolved. 0.6 moles HSCH$_2$CH$_2$OH and 0.15% ABIN was added and the solution was heated to 80° C., while stirring at 160 rpm. The reaction was run under nitrogen atmosphere at 80° C. during 16 hours, after which more than 95% conversion was obtained.

In a second step, the fluorochemical oligomer was reacted with an equimolar amount of isocyanato propyl trimethoxysilane OCN(CH$_2$)$_3$Si(OCH$_3$)$_3$ according to the following method:

In a three necked flask of 500 ml, fitted with a condenser, stirrer and thermometer, were placed 83 g (0.02 mole) of a 60% solution of fluorochemical oligomer MeFOSEA/HSCH$_2$CH$_2$OH as prepared above, 22 g ethylacetate, 5 g (equimolar amounts) OCN(CH$_2$)$_3$Si(OCH$_3$)$_3$ and 2 drops stannous octoate catalyst, under nitrogen atmosphere. The mixture was heated up to 75° C. under nitrogen and reacted during 16 hours. No residual isocyanate could be detected by infra red analysis.

Further fluorochemical silanes were prepared using the above procedure and starting from the fluorochemical oligomers as given in table 2. The fluorochemical silanes were made by equimolar reaction of the fluorochemical oligomers with isocyanato propyl trimethoxysilane. Comparative fluorochemical silane C—FC-2 was made by reacting MeFOSE with equimolar amounts of isocyanato propyl trimethoxysilane.

TABLE 2

| FCSIL | FC oligomer | Molar ratio |
| --- | --- | --- |
| 8 | MeFOSEA/HSCH$_2$CH$_2$OH | 4/1 |
| 9 | MeFOSEMA/HSCH$_2$CH$_2$OH | 4/1 |
| 10 | MeFOSEA/HSCH$_2$CH$_2$OH | 8/1 |
| 11 | EtFOSEA/HSCH$_2$CH$_2$OH | 4/1 |
| 12 | Telomer acrylate/HSCH$_2$CH$_2$OH | 4/1 |
| 13 | MeFOSEA/iso BMA/HSCH$_2$CH$_2$OH | 3.2/0.8/1 |
| 14 | MeFOSEA/HSCH$_2$CH(OH)CH$_2$OH | 4/1 |

Examples 1 to 6 and Comparative Examples C-1 to C-3

In Examples 1 to 6, white glazed ceramic wall tiles from Katayha (10 cm×20 cm) were coated with 0.5% ethyl acetate solutions of fluorochemical silanes, as given in table 3. The tiles were coated and dried according to the general method. Comparative Examples C-1 to C-3 were made in the same way with comparative treating agents in amounts as given in table 3. Contact angles were measured before and after abrasion using the Crockmeter. The results of spray rating and contact angles are given in Table 3.

TABLE 3

Spray Rating and Contact Angles of Tiles Treated with Fluorochemical Silanes

| | | | Contact angles (°) | | | |
| --- | --- | --- | --- | --- | --- | --- |
| | | Spray | DI-water | | n-Hexadecane | |
| Ex | Treating agent | rating | Initial | Abraded | Initial | Abraded |
| 1 | FCSIL-1 | 100 | 110 | 85 | 63 | 46 |
| 2 | FCSIL-2 | 100 | 118 | 88 | 67 | 51 |
| 3 | FCSIL-3 | 100 | 109 | 84 | 65 | 50 |
| 4 | FCSIL-4 | 100 | 110 | 83 | 66 | 50 |
| 5 | FCSIL-5 | 100 | 108 | 83 | 65 | 46 |
| 6 | FCSIL-6 | 100 | 113 | 85 | 66 | 49 |
| C-1 | C-FC-1 | 90 | 98 | 78 | 64 | 38 |
| C-2 | FC-405 (0.5%) | 90 | 93 | 76 | 54 | 40 |
| C-3 | FC-405 (2%) | 90 | 100 | 80 | 61 | 42 |

The results indicated that tiles with high oil and water repellency could be made by using fluorochemical silanes according to the invention. High contact angles were measured, initially, but especially also after abrasion, indicating that highly durable coatings were made. High spray rating values indicated that tiles with high dynamic water repellency were made. Taking into account that a difference in contact angle with distilled water of 10° and a difference in contact angle with n-hexadecane of 5° is considered to be significant, the tiles treated with fluorochemical silanes according to the invention had much higher oil and water repellency properties as compared to tiles treated with comparative examples (even at higher add-on levels).

Example 7

In Example 7, white glazed ceramic wall tiles from Katayha (10 cm×20 cm) were coated with a 0.5% ethyl acetate solution of fluorochemical silane FCSIL-7. The tiles were coated and dried according to the general method. The results of spray rating and contact angles are given in Table 4.

TABLE 4

Spray rating and contact angles of tiles treated with FCSIL-7

| Ex | Treating agent | Spray rating | DI-water Initial | DI-water Abraded | n-Hexadecane Initial | n-Hexadecane Abraded |
|---|---|---|---|---|---|---|
| 7 | FCSIL-7 | 90 | 90 | 74 | 50 | 43 |

The results indicated that also short chain fluorochemical monomer could be used in the production of an efficient oil and water repellent fluorochemical silane coating.

Examples 8 to 15 and Comparative Examples C-4 and C-5

In examples 8 to 15, white glazed ceramic wall tiles (10 cm×20 cm) were coated with a 0.1 to 1% solution of fluorochemical silane, as given in table 5, in ethylacetate and according to the general method. Comparative examples C-4 and C-5 were made in the same way, but with comparative treating agents in amounts as given in table 5. Contact angles were measured before and after abrasion using the Crockmeter. The results are given in table 5.

TABLE 5

Contact angles of wall tiles treated with fluorochemical silanes

| Ex | Treating agent (weight % applied) | DI-water Initial | DI-water Abraded | Hexadecane Initial | Hexadecane Abraded |
|---|---|---|---|---|---|
| 8 | FCSIL-8 (1%) | 130 | 97 | 80 | 70 |
| 9 | FCSIL-9 (1%) | 130 | 92 | 74 | 64 |
| 10 | FCSIL-10 (1%) | 118 | 85 | 73 | 60 |
| 11 | FCSIL-11 (1%) | 115 | 90 | 73 | 63 |
| 12 | FCSIL-12 (1%) | 130 | 95 | 80 | 72 |
| 13 | FCSIL-13 (1%) | 114 | 87 | 70 | 58 |
| 14 | FCSIL-14 (1%) | 125 | 95 | 75 | 68 |
| 15 | FCSIL-8 (0.1%) | 110 | 65 | 70 | 58 |
| C-4 | C-FC-1 (1%) | 104 | 82 | 64 | 42 |
| C-5 | C-FC-2 (5%) | 106 | 84 | 65 | 49 |

The results in the table indicated that high durable and efficient coatings could be made with the fluorochemical oligomer silanes according to the invention, even at very low add-on levels (as low as 0.1%). Considerably higher oil and water repellency was obtained for tiles treated with compounds of the invention compared to tiles treated with a fluorochemical oligomer having no silane functionality or with a fluorochemical silane compound.

What is claimed is:

1. Method of treating a substrate comprising applying to said substrate a composition to form a treated substrate wherein said substrate is selected from the group consisting of plastics, ceramics, and glass and said composition comprises a major amount of organic solvent and 0.05% by weight to 5% by weight of fluorochemical oligomer dispersed or dissolved in said organic solvent and said fluorochemical oligomer being represented by the general formula:

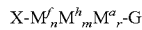

wherein X represents the residue of an initiator or hydrogen, $M^f$ represents units derived from fluorinated monomers; $M^h$ represents units derived from non-fluorinated monomers; $M^a$ represents units having a silyl group represented by the formula:

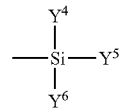

wherein each of $Y^4$, $Y^5$, and $Y^6$ independently represents an alkyl group, an aryl group, or a hydrolyzable group; G is a monovalent organic group comprising the residue of a chain transfer agent; n represents a value of 1 to 100; m represents a value of 0 to 100; r represents a value of 0 to 100; and n+m+r is at least 2;

with the proviso that at least one of the following conditions is fulfilled: (a) G is a monovalent organic group that contains a silyl group of the formula:

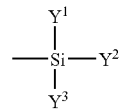

wherein $Y^1$, $Y^2$, and $Y^3$ each independently represents an alkyl group, an aryl group, or a hydrolyzable group with at least one of $Y^1$, $Y^2$, and $Y^3$ representing a hydrolyzable group; or (b) r is at least 1 and at least one of $Y^4$, $Y^5$, and $Y^6$ represents a hydrolyzable group.

2. Method according to claim 1 wherein at least one of $Y^1$, $Y^2$, and $Y^3$ and/or at least one of $Y^4$, $Y^5$, and $Y^6$ is a hydrolyzable group selected from the group consisting of halogen, an alkoxy group, an acyloxy group, an acyl group, and an aryloxy group.

3. Method according to claim 1 wherein said monovalent organic group G corresponds to the general formula:

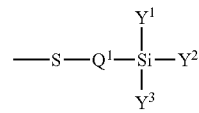

wherein $Y^1$, $Y^2$, and $Y^3$ each independently represents an alkyl group, an aryl group, or a hydrolyzable group with at least one of $Y^1$, $Y^2$, and $Y^3$ representing a hydrolysable group, and wherein $Q^1$ represents an organic divalent linking group.

4. Method according to claim 1 wherein $M^f$ comprises a unit derived from a fluorinated monomer of the formula:

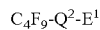

wherein $E^1$ represents a free radical polymerizable group and $Q^2$ represents an organic divalent linking group.

5. Method according to claim 1 wherein $M^a$ is a unit derived corresponding to the formula:

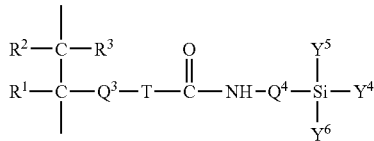

wherein $R^1$, $R^2$, and $R^3$ each independently represents hydrogen, an alkyl group, an aryl group or halogen, $Q^3$ represents an organic divalent linking group, $Q^4$ represents an organic divalent linking group, T represents O or NR with R being hydrogen, an aryl or a $C_1$–$C_4$ alkyl group, and $Y^4$, $Y^5$, and $Y^6$ each independently represents an alkyl group, an aryl group, or a hydrolyzable group.

6. Method according to claim 1 wherein G corresponds to the formula:

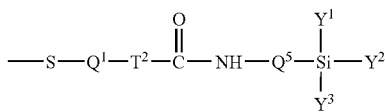

wherein $Q^1$ and $Q^5$ each independently represents an organic divalent linking group, $T^2$ represents O or NR with R being hydrogen, an aryl or a $C_1$–$C_4$ alkyl group, and $Y^1$, $Y^2$, and $Y^3$ each independently represents an alkyl group, an aryl group, or a hydrolyzable group with at least one of $Y^1$, $Y^2$, and $Y^3$ representing a hydrolysable group.

7. Method according to claim 1 wherein the composition is a homogeneous composition further comprising water and an organic or inorganic acid.

8. Method according to claim 1 wherein the units derived from non-fluorinated monomers correspond to the general formula:

wherein $R^h$ represents a hydrocarbon group, $Q^6$ is a divalent linking group, s is 0 or 1, and $E^3$ is a free radical polymerizable group.

9. Method according to claim 1 further comprising exposing the treated substrate to water and an organic or inorganic acid.

10. Method according to claim 1 further comprising the step of exposing the treated substrate to an elevated temperature of 60° C. to 300° C.

11. Substrate comprising a coating derived from a coating composition comprising a major amount of organic solvent and 0.05% by weight to 5% by weight of fluorochemical oligomer dispersed or dissolved in said organic solvent and said fluorochemical oligomer being represented by the general formula:

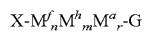

wherein X represents the residue of an initiator or hydrogen; $M^f$ represents units derived from fluorinated monomers; $M^h$ represents units derived from non-fluorinated monomers; $M^a$ represents units having a silyl group represented by the formula:

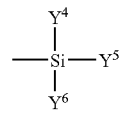

wherein each of $Y^4$, $Y^5$, and $Y^6$ independently represents an alkyl group, an aryl group, or a hydrolyzable group; G is a monovalent organic group comprising the residue of a chain transfer agent; n represents a value of 1 to 100; m represents a value of 0 to 100; r represents a value of 0 to 100; and n+m+r is at least 2;

with the proviso that at least one of the following conditions is fulfilled: (a) G is a monovalent organic group that contains a silyl group of the formula:

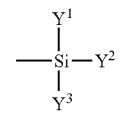

wherein $Y^1$, $Y^2$, and $Y^3$ each independently represents an alkyl group, an aryl group, or a hydrolyzable group with at least one of $Y^1$, $Y^2$, and $Y^3$ representing a hydrolyzable group; or (b) r is at least 1 and at least one of $Y^4$, $Y^5$, and $Y^6$ represents a hydrolyzable group wherein the substrate is selected from the group consisting of plastics, ceramics, and glass.

* * * * *